Oct. 31, 1933.  E. A. LARSSON  1,933,145

CAR COUPLER

Filed Oct. 24, 1928   2 Sheets-Sheet 1

WITNESS:
H. J. Stromberger

Inventor
ERNST A. LARSSON
By
Attorney

Oct. 31, 1933.                    E. A. LARSSON                    1,933,145
                                    CAR COUPLER
                          Filed Oct. 24, 1928            2 Sheets-Sheet 2
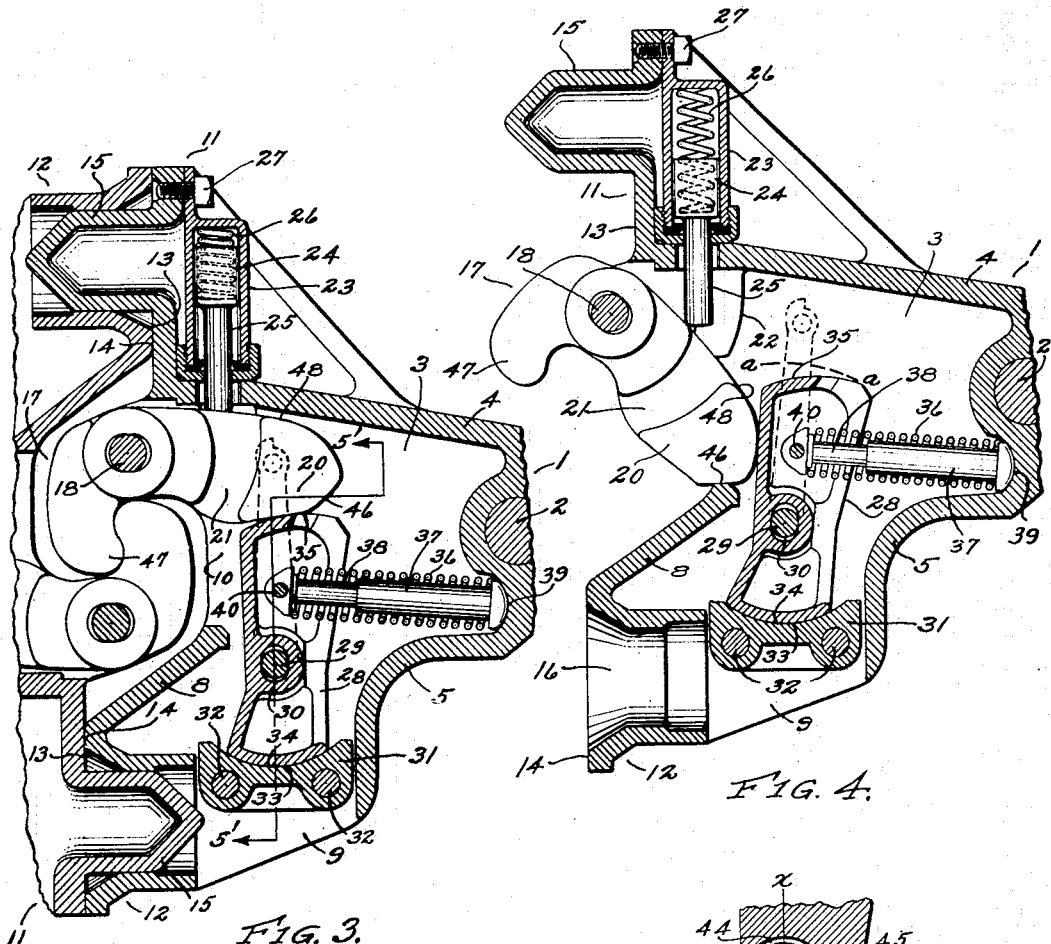
Inventor
ERNST A. LARSSON.

Patented Oct. 31, 1933

1,933,145

UNITED STATES PATENT OFFICE 1,933,145

CAR COUPLER

Ernst A. Larsson, Mansfield, Ohio, assignor to The Ohio Brass Company, Mansfield, Ohio, a corporation of New Jersey Application October 24, 1928. Serial No. 314,600

1 Claim. (Cl. 213—150)

My invention relates to car couplers and has for its objects to provide a coupler of the Janney type which will so intercouple with a cooperating head of like design that there will be no relative lateral, vertical, rotating or longitudinal movement of the coupled heads.

My invention resides in the new and novel construction, relation and combination of the various elements hereinafter described and shown in the accompanying drawings:

In the drawings:

Fig. 3 is a view in partial section on the line 3—3 of Fig. 2 showing the coupling mechanism in fully coupled relation and with a cooperating head.

Fig. 4 is a view in partial section also taken on the line 3—3 of Fig. 2 and corresponds to the section shown in Fig. 3 excepting the parts are shown in a fully uncoupled relation ready to be brought into coupling engagement with a like cooperating head.

Fig. 6 is a sectional view taken on the line 6—6 of Fig. 1 and shows another position of the uncoupling handle with respect to the locking member.

Fig. 7 is a sectional view of Fig. 6 and shows another view of the relation of the handle to the locking member.

Figure 1:
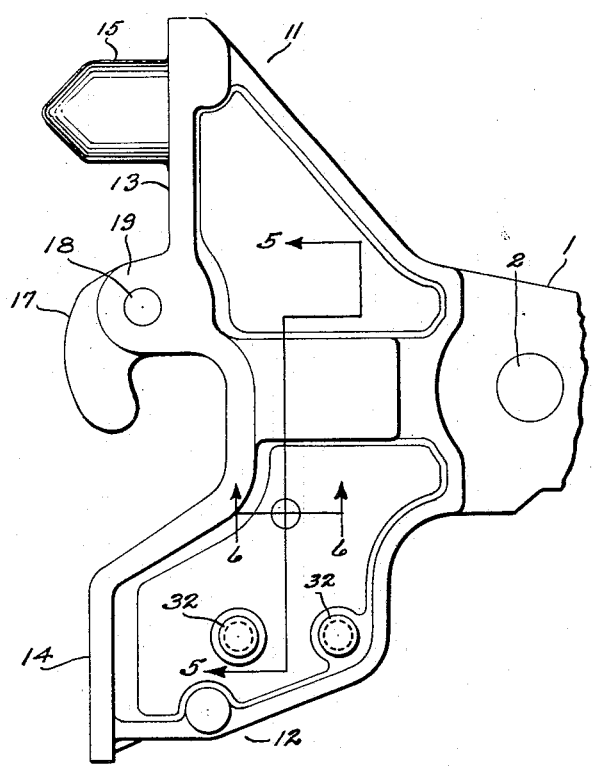
Fig. 1 is a top plan view of the forward or coupling end of my improved head.
Figure 2:
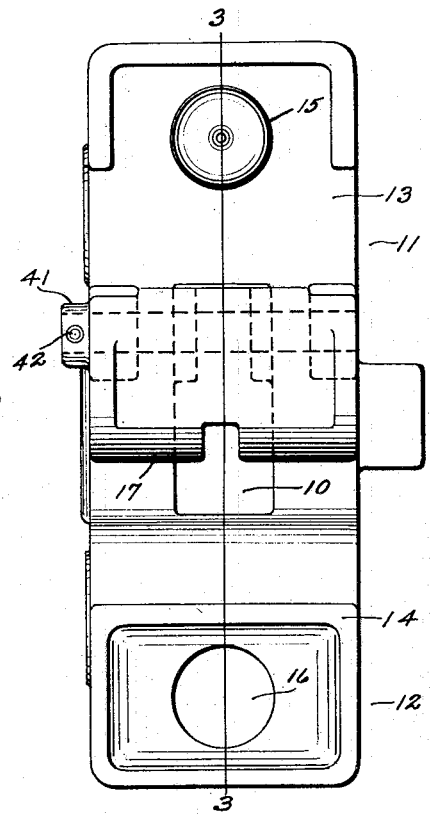
Fig. 2 is a face view of Fig. 1.
Figure 5:
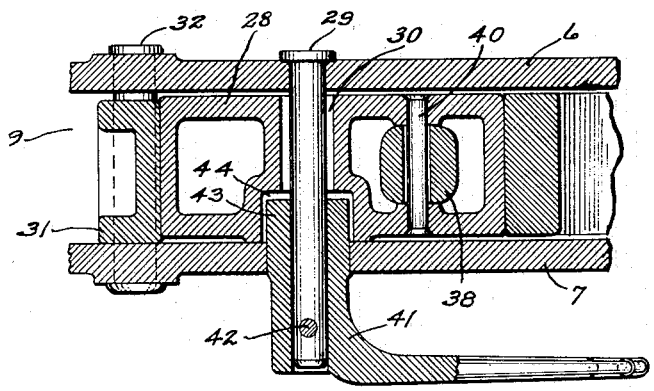
Fig. 5 is a view in partial section taken on the line 5—5 of Fig. 1 and shows the relation of the uncoupling handle with respect to the locking member and also the relation of the locking member to the coupling and compression member.

An ideal coupler is one which would act as a continuous rigid bar between two coupled cars, which would permit the automatic coupling of the train line circuits such as the air break lines, steam lines and the electric circuits, and which would, therefore, reduce the wear and tear upon the couplers to a minimum due to the lack of any relative movement of the contact surfaces on the couplers. Also, the absence of any relative longitudinal movement of the couplers along their longitudinal axes would reduce materially the wear and tear upon the equipment and also add to the comfort of the passengers if such rigid couplers would be used upon passenger cars. Further, the automatic coupling and uncoupling of the train line circuits would lessen materially injury to operators as it would avoid the necessity of going between cars to make such connections as at present.

A successful coupler of the Janney type employing knuckles of the M. C. B. or A. R. A. or other types of knuckle in which there is no relative movement of the coupled heads in any direction has not been, up to the present time, used on roads but other types of couplers without any relative movement between the coupled heads have been used for many years in connection with electrically operated traction lines.

In the preferred embodiment of my invention I employ a body member 1 which may be pivoted to a draft gear as by means of a pin 2. The body member is provided with a cavity 3 formed with side walls 4 and 5 and top and bottom walls 6 and 7 and the front wall 8. The side wall 5 has a side opening 9 and the front wall has an opening 10. Projecting laterally from the side walls 4 and 5 are projecting arms 11 and 12 provided with butting faces 13 and 14 respectively.

Projecting longitudinally from the arm 11 is a pin member 15 and the arm 12 is provided with a recess 16, which is provided with a flaring opening to receive the pointed pin 15 and thereby permit two approaching heads to properly aline as they approach even though they may be considerably out of alinement laterally or vertically or both as the couplers approach. The pin 15 and the opening 16 are so proportioned that when the two heads are brought together, the faces of the two heads will contact and there will be no relative lateral or vertical movement of the heads but they will be held rigidly against such movement through the interlocking of the pins and recesses.

Mounted in the face of the coupler and projecting through the opening 10 is a knuckle 17 of the Janney type and which may be patterned after the M. C. B. or the A. R. A. designs or any other designs of the Janney type which will meet the requirements as hereinafter disclosed. The knuckle 17 is provided with a vertical hole of oblong cross-section and is mounted and held in position by means of a circular pin 18 secured to projecting top and bottom lugs 19 on the head.

The tail 20 of the knuckle is provided with oppositely disposed grooves 21 in the upper and lower face thereof which engage with upper and lower ribs 22 integrally formed with the body 1 and the side faces of the grooves 21 engage with the faces of the ribs 22 when the knuckle is in the closed position, thereby relieving the pin 18 of all or a maximum of the strain due to the clearance provided between the pin 18 and the oblong shaped passage for the pin in the knuckle.

I employ means for moving the knuckle to its open position and helping to maintain it in that position and consisting of a cylindrical member 23 provided with a piston 24 and a projecting rod 25 which engages the knuckle, and a spring 26 which is biased at all times to projecting the piston and rod. The member 23 may be formed as shown and secured to the body member by means of one or more bolts 27.

In order to move the knuckle to its final locking position when two heads engage and to hold it in this final locking position, I employ a locking member 28 which acts as a floating wedge or cam and which is mounted in the hollow space 3 of the head by means of a vertical pin 29 passing through the upper and lower members 6 and 7. The member 28 is provided with an oblong passage 30 to receive the pin 29. This permits the locking member 28 to not only rotate upon the pin 29, but to move thereon in the direction of the long diameter of the passage 30, thereby permitting the member 28 to adjust itself with respect to the knuckle 17 and a compression member 31 and positively relieve the pin 29 of any pressure of any moment.

The compression member 31 is positioned in the side opening 9 and is held in position by means of the bolts or rivets 32 which are secured to the head. The member 31 is made separable for several reasons namely, the contacting face 33 can be machined or formed to a proper curvature which I prefer to be that of a radius of a circle with the axis of the pin 29 as a center. Also, the position of the face 33 with respect to the axis of the pin 29 can be accurately secured. These two points in particular would be difficult to secure if the member 31 were cast as an integral part of the head 1. Also, if in time there should be wear to this part, it can be very easily renewed and it closes the opening 9 through which the lock member 28 may be inserted in assembling the head.

The surface 34 coincides with that of the surface 33 on the member 31 and its radius has a center corresponding with the intersection of the long and short diameters of the passage 30. The opposite end of the lock 28 is provided with a surface 35 which is eccentric with that of the surface 34 and with respect to the center of intersection of the diameters of the passage 30, and brings about a wedging or cam action with respect to the tail 20 of the knuckle 17 and under the action of the spring 36 forces the knuckle 17 into its final locking position and also constantly urges the knuckle to further and more tightly draw the knuckles together as well as holding the knuckles in their tightly locked relation.

If the face 35 were made circular, using as the center of its radius the center of intersection of the long and short diameters of the passage 30, such surface would correspond with the dotted line $a$—$a$ in Fig. 4. From this it will be seen that I have provided a wedge for forcing the knuckles into their final locked relation and that such wedge is of a rotating character with respect to the axis of the pin 29 and is also of a floating character with respect not only to the pin 29, but with respect to the members 20 and 31, and therefore tends to adjust itself with respect to the members 20, 29 and 31, and all pressure tending to unlock the knuckles when in coupled relation is transmitted directly to the body member 4 through the compression member 31 and the attaching pins 32. Therefore the lock member 28 forms a compression member also of a most solid and rigid nature between the knuckle and the body to prevent the yielding of the knuckles.

The spring 36 is secured upon two telescopic members 37 and 38 and tends to move these members apart. The member 37 is pivotally secured in a socket 39 of the body member, and the member 38 is secured pivotally to the locking member 28 by means of the pin 40.

In order to move the locking member 28 to its unlocked relation with respect to the knuckle 17, I provide a socketed handle 41 mounted upon the lower end of the pin 29 and secured thereto against rotation by the through rivet 42. The handle is provided at its upper end with an extension 43 which fits into an enlarged opening 44 of the lock member 28 and this opening is somewhat oblong in shape, having flat sides 45 which correspond with similar flat sides on the projection 43. The long diameter of the slot 44 is shown to be greater than the length of the projection 43, thereby avoiding any interference to the relative movement of the lock 28 with respect to the pin 29 in the direction of the long diameter $x$—$x$.

It will be noted, however, that the projection 43 is of practically the same width as the short diameter $y$—$y$ of the recess 44.

When two heads are brought together with both of their knuckles or one in the position shown in Fig. 4, they will start to aline as soon as the pins 15 begin to enter the flaring mouths of the recesses or intersections 16, and as the heads proceed toward each other, the knuckles will either engage with the faces of the walls 8 and be forced into locking position with each other, or if one knuckle is open and the other closed, the closed knuckle will engage with the tail 20 of the open knuckle and force it around into a locking position. When the heads have approached a sufficient distance, the tail 20 will have rotated a sufficient distance such that it will clear the end of the lock 28, and the spring 36 will then force the lock 28 about the pin 29 and the contact wedge shaped face 35 will begin to engage with the contact face 46 of the tail and will force the knuckle to rotate farther about the pin 18 and will draw the knuckle heads 47 into engagement with each other. When the coupler heads have come together so that their faces 13 and 14 meet, the knuckles will have been rotated about their pins 18 through the medium of the locking member 28 and its spring mechanism 36 until the heads 47 engage and actually draw the knuckles into tight relation with each other and in interlocking relation with the ribs 22 on the body. The heads are now in their finally locked position and prevented from separating by the locking member 28 through the agency of the spring mechanism 36 constantly urging the knuckles into a tighter locked relation.

I provide no stops for the knuckle so that its movement in a locking direction is unrestricted by the locking member 28. Therefore the knuckles are constantly urging the faces of the coupler heads into tighter abutting relation and the pins 15, interlocking with the intersections 16 of the opposite head, prevents any lateral or vertical or rotating movement of the heads relative to each other and the heads will form, as it were, a single rigid bar connecting the two coupled cars with the longitudinal axes of the heads in substantial alinement.

In order to separate two coupled heads it is only necessary to operate the handle 41 on one head, as is the present practice with the standard steam road couplers, and when the lock 28 is moved to its fully releasing position, the tail of the knuckle will be swung about its pin 18 through the action of the spring mechanism 26 and into the position shown in Fig. 4, and in this position the lock 28 under the action of the spring mechanism 36 will press against the end of the tail 20 and assist in holding the knuckle in its open position, and the knuckle will hold the lock in releasing position when the handle 41 is released.

It will be seen that the strain upon the knuckles when two heads are coupled is transmitted from the knuckle directly to the body through the ribs 22. There will also be a side component strain to the tail of the knuckle in the direction of the pin 29, but this component will be relatively small compared with the direct strain upon the ribs 22. Therefore, the compression under which the member 28 is placed is not great, but such compression is brought directly upon the member 31, which can be made very secure with the head member 1 through the medium of pins or rivets 32. Were it not for engagement of the member 28 with the member 31, the holding strain of the member 28 would be brought wholly upon the pin 29, but by my construction I relieve the pin 29 of all strain of any moment and the member 28 is made adjustable between the knuckle 17 and the member 31.

Space is provided between the back face 48 of the knuckle and the inner face of the side member 4 so that there is no stoppage to the knuckle being moved to its locked position and beyond that position if necessary in order to bring the coupler faces into abutting relation and maintain them in that relation. Also, there is nothing to stop the rotation of the locking member 28 within reasonable limits and under action of the spring mechanism 36.

Having described my invention, I claim:—

In a coupler head, a knuckle having a knuckle tail, a swinging lock to cooperate with the knuckle to lock the knuckle open or closed comprising an elongated member, a cam-shaped face at one end to engage the knuckle tail, an arcuate bearing face on the opposite end to engage a fixed bearing on the coupler head, a transverse elliptical-shaped opening in the lock to receive a pin upon which the lock pivots and shifts longitudinally and means pivoting relative to the member and the coupler head to pivot the lock on the pin and comprising a pair of telescopically mounted members having one end of one telescopic member pivotally secured to the elongated member and one end of the other telescopic member pivotally engaging the head and a spring to elongate the assembled telescopically mounted members to pivot the lock into locking engagement with the knuckle.

ERNST A. LARSSON.